(12) United States Patent
Huang (10) Patent No.: US 11,481,338 B2
(45) Date of Patent: Oct. 25, 2022

(54) HARDWARE CONTROL SYSTEM AND HARDWARE CONTROL METHOD

(71) Applicant: MStar Semiconductor, Inc., Hsinchu Hsien (TW)

(72) Inventor: Chien-Hsing Huang, Hsinchu Hsien (TW)

(73) Assignee: MEDIATEK INC., Hsinchu (TW)

( * ) Notice: Subject to any disclaimer, the term of this patent is extended or adjusted under 35 U.S.C. 154(b) by 438 days.

(21) Appl. No.: 16/036,989

(22) Filed: Jul. 17, 2018

(65) Prior Publication Data

US 2019/0196980 A1 Jun. 27, 2019

(30) Foreign Application Priority Data

Dec. 21, 2017 (TW) .................................. 106144975

(51) Int. Cl.
*G06F 12/14* (2006.01)
*G06F 12/1009* (2016.01)

(52) U.S. Cl.
CPC ........ *G06F 12/145* (2013.01); *G06F 12/1009* (2013.01); *G06F 2212/1016* (2013.01)

(58) Field of Classification Search
CPC .................................................... G06F 12/145
See application file for complete search history.

(56) References Cited

U.S. PATENT DOCUMENTS

| 5,784,707 A * | 7/1998 | Khalidi ............... G06F 12/1009 711/206 |
| 2002/0016892 A1* | 2/2002 | Zalewski .............. G06F 9/5077 711/153 |
| 2003/0149851 A1* | 8/2003 | Shiota ................. G06F 12/1425 711/163 |

* cited by examiner

*Primary Examiner* — Jae U Yu
(74) *Attorney, Agent, or Firm* — McClure, Qualey & Rodack, LLP (57) ABSTRACT

A hardware control system and a hardware control method are provided. The hardware control system is for controlling a function circuit, and includes a first transformation circuit, a second transformation circuit and an analysis circuit. The first transformation circuit transforms a command from an operating system to an intermediate address. The second transformation circuit transforms the intermediate address to a permission physical address according to an identifier of the operating system, wherein the permission physical address consists of a hardware physical address and a permission value. The analysis circuit analyzes the permission physical address to generate the hardware physical address and the permission value, and determines a control value corresponding to the hardware physical address according to the permission value. The control value is for permitting the operating system to control the function circuit.

20 Claims, 7 Drawing Sheets

HARDWARE CONTROL SYSTEM AND HARDWARE CONTROL METHOD

This application claims the benefit of Taiwan application Serial No. 106144975, filed Dec. 21, 2017, the subject matter of which is incorporated herein by reference.

BACKGROUND OF THE INVENTION

Field of the Invention

The invention relates to a control system and a control method, and more particularly to a hardware control system and a hardware control method.

Description of the Related Art

With the progressing technologies, various electronic products are constantly evolving. Many electronic products are equipped with various function circuits to realize various functions. For example, a function circuit is a circuit having a particular function, such as decryption circuit, a decoding circuit, a graphics circuit, and each function circuit may include one or more functions. Taking information security into account, a system needs to have permission control over various function circuits. More particularly, when different operating systems share multiple function circuits, only a specific function of a specific function circuit needed by a currently utilized operating system is enabled, while other function circuits and other functions of the specific function circuit are disabled. For example, while an operating system permits a decoding circuit to decode copyrighted multimedia content through a key, the permission for duplicating the decoded multimedia content needs to be blocked from the decoding circuit and other function circuits, so as to prevent piracy of such copyrighted multimedia content.

Conventionally, an electronic device uses a software program (e.g., a virtual machine, VM) operated by a processor to transform commands sent by different operating systems to a specific intermediate address, and a hardware physical address is then acquired by a transformation circuit and an identifier of the operating system, so as to further enable or disable a specific function of the specific function circuit according to the hardware physical address.

However, a conventional method is incapable of allowing an operating system to directly operate a function circuit permitted to be enabled, and commands need to be constantly transformed by a virtual machine to intermediate addresses, resulting in a quite time-consuming and resource-consuming operation process.

SUMMARY OF THE INVENTION

The invention is directed to a hardware control system and a hardware control method that differentiate commands from different operating systems by including a permission value in a permission physical address. Thus, an operating system is allowed to directly operate a function circuit permitted to be enabled without involving a virtual machine for the operation.

A hardware control method is provided according to an aspect of the present invention. The hardware control method includes steps of: transforming a command from an operating system to an intermediate address; transforming the intermediate address to a permission physical address according to an identifier of the operating system, wherein the permission physical address consists of a hardware physical address and a permission value; analyzing the permission physical address to generate the hardware physical address and the permission value; determining a control value corresponding to the hardware physical address; and permitting the operating system to control the function circuit according to the control value.

A hardware control system is provided according to another aspect of the present invention. The hardware control system is for controlling a function circuit, and includes a first transformation circuit, a second transformation circuit and an analysis circuit. The first transformation circuit transforms a command from an operating system to an intermediate address. The second transformation circuit transforms the intermediate address to a permission physical address according to an identifier of the operating system, wherein the permission physical address consists of a hardware physical address and a permission value. The analysis circuit analyzes the permission physical address to generate the hardware physical address and the permission value, and determines a control value corresponding to the hardware physical address according to the permission value. The control value is for permitting the operating system to control the function circuit.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
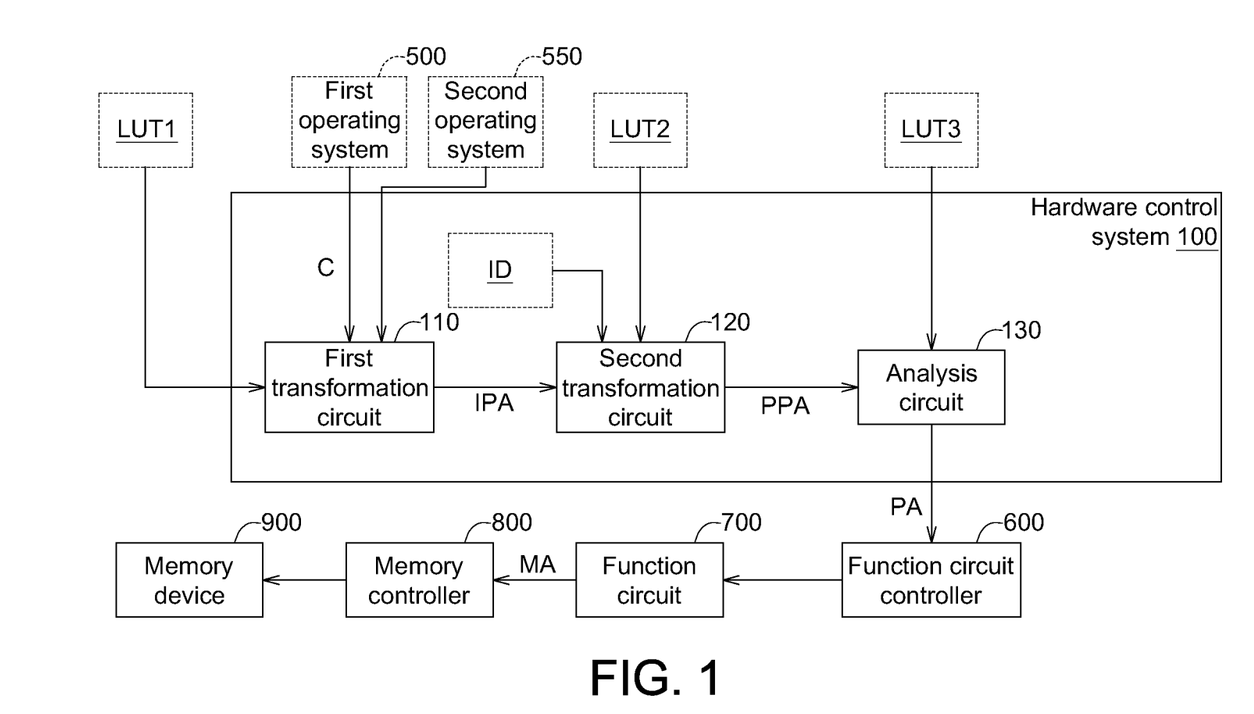
FIG. 1 is a block diagram of a hardware control system according to an embodiment of the present invention.

FIG. 1 shows a block diagram of a hardware control system 100 according to an embodiment of the present invention. The hardware control system 100 includes a first transformation circuit 110, a second transformation circuit 120 and an analysis circuit 130. The first transformation circuit 110, the second transformation circuit 120 and the analysis circuit 130 are for example, a circuit module in a chip, a circuit board or a chip. Operation details of the components are given with the accompanying flowchart below.

Figure 2:
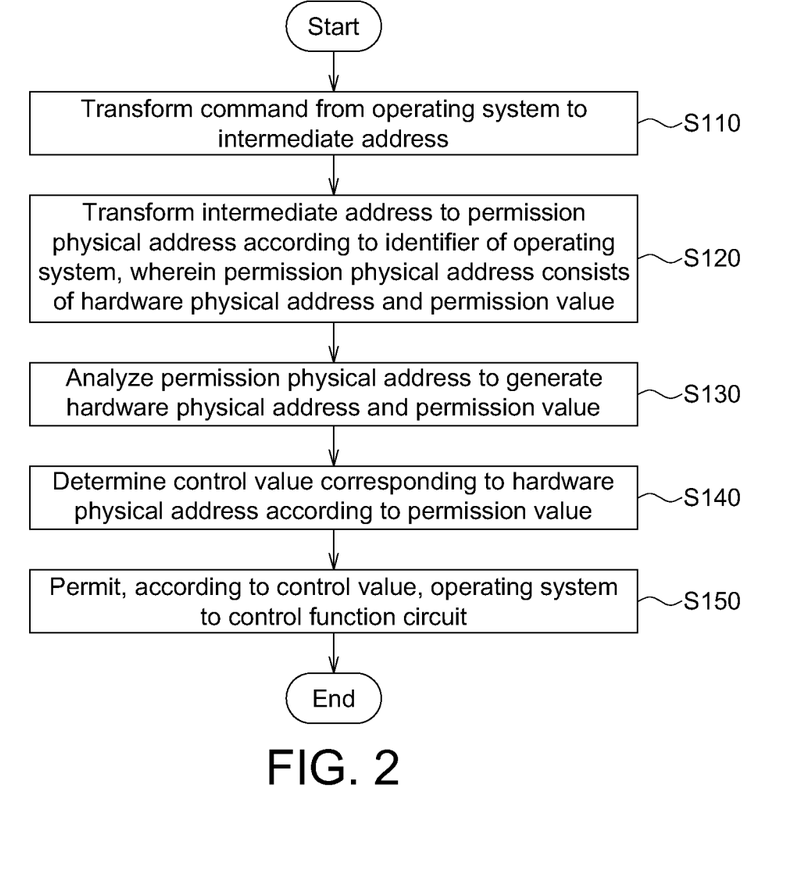
FIG. 2 is a flowchart of a hardware control method according to an embodiment of the present invention.

FIG. 2 shows a flowchart of a hardware control method according to an embodiment of the present invention. Referring to FIG. 2, in step S110, the first transformation circuit 110 transforms a command C from an operating system 500 to an intermediate address IPA. The first transformation circuit 110 obtains the intermediate address IPA by looking up a first look-up table LUT1 according to the command C. The first look-up table LUT1 is established by a processor that operates a software program (e.g., a virtual machine) during booting, and records a corresponding relationship between the command C and the intermediate address IPA.

After obtaining the intermediate address IPA, the first transformation circuit 110 transmits the intermediate address IPA to the second transformation circuit 120.

Figure 3:
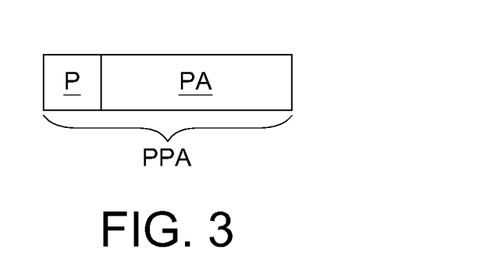
FIG. 3 is a schematic diagram of a permission physical address according to an embodiment of the present invention.

In step S120, the second transformation circuit 120 transforms the intermediate address IPA to a permission physical address PPA. For example, FIG. 3 shows a schematic diagram of a permission physical address PPA according to an embodiment of the present invention. In one embodiment, the permission physical address PPA consists of a hardware physical address PA and a permission value P. The hardware physical address PA corresponds to a function circuit controller 600 having a control value, wherein the control value is for permitting to operate or prohibiting from operating a function circuit 700. In practice, the control value is a state of the function circuit controller 600, and the function circuit controller 600 may be a memory or a register. In another embodiment, the control value is for permitting to operate or prohibiting from operating one or more specific functions of the function circuit 700, and different specific functions of the function circuit 700 may be simultaneously be controlled by control values of multiple different function circuit controllers 600. The permission value P is arranged before the hardware physical address PA. In this step, the second transformation circuit 120 looks up a second look-up table LUT2 according to the intermediate address IPA to obtain the permission physical address PPA. In another embodiment, the second transformation circuit 120 further looks up the second look-up table LUT2 according to an identifier ID obtain the permission physical address PPA. The identifier ID is for indicating which operating system is currently operating. For example, in this embodiment, the identifier ID indicates that the first operating system 500 is currently operating. The second look-up table LUT2 established by a processor that operates a software program (e.g., a virtual machine) during booting, and records a relationship between the intermediate address IPA and the permission physical address PPA. In another embodiment, the second look-up table LUT2 records the corresponding relationship of the intermediate address IPA, the identifier ID and the permission physical address PPA.

Figure 4:
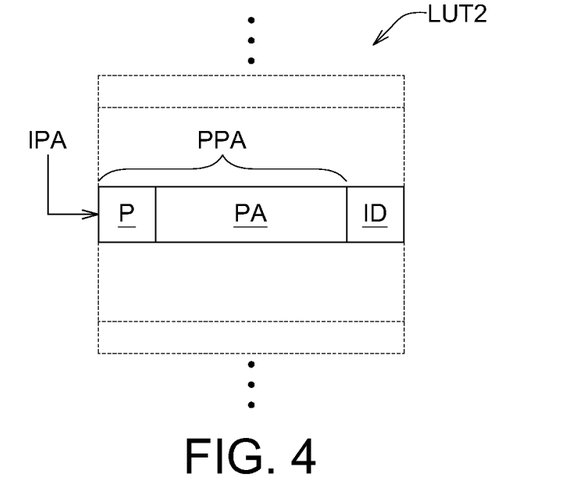
FIG. 4 is a schematic diagram of a second look-up table (LUT2)

For example, FIG. 4 shows a schematic diagram of the second look-up table LUT2. The second transformation circuit 120 finds a set of permission physical address PPA according to the intermediate address IPA, and at the same time verifies the identifier ID recorded subsequent to the permission physical address PPA. If the identifier ID is verified as a matching result, the permission physical address PPA can then be obtained.

After obtaining the permission physical address PPA, the second transformation circuit 120 transmits the permission physical address PPA to the analysis circuit 130.

Figure 5:
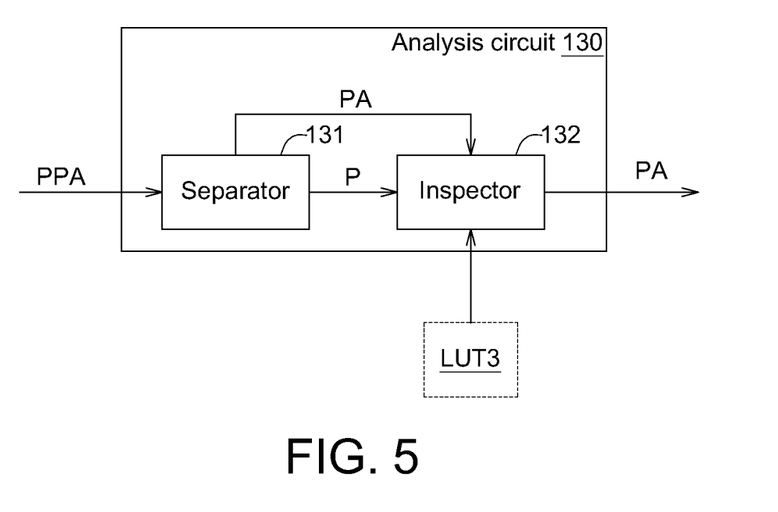
FIG. 5 is a block diagram of an analysis circuit in FIG. 1.

In step S130, the analysis circuit 130 analyzes the permission physical address PPA to generate the hardware physical address PA and the permission value P. FIG. 5 shows a block diagram of the analysis circuit 130 in FIG. 1. In one embodiment, the analysis circuit 130 includes a separator 131 and an inspector 132. In this step, the hardware physical address PA is separated from the permission value P by the separator 131, and the hardware physical address PA and the permission value P are then transmitted to the inspector 132.

In step S140, the inspector 132 of the analysis circuit 130 looks up a third look-up table LUT3 according to the permission value P to determine a control value corresponding to the hardware physical address PA. The third look-up table LUT3 is established by a processor that operates a software program (e.g., a virtual machine) during booting, and records the permission value P and the hardware physical address(es) of one or more function circuit controllers 600 corresponding to the permission value P.

In step S150, the function circuit controller 600 permits the first operating system 500 to control the function circuit 700 according to the control value. As shown in FIG. 1, through the hardware physical address PA, the control value corresponding to the function circuit controller 600 can be determined, so as to further permit to operate one or more specific functions of the corresponding function circuit 700. While the function circuit 700 operates, a memory address MA in a memory device 900 may be accessed through a memory controller 800.

In the above embodiment, by including the permission value P in the permission physical address PPA, commands from different operating systems (e.g., the first operating system 500 and a second operating system 550) may be directly differentiated. Thus, the first operating system 500 and/or the second operating system 550 is permitted to directly operate the enabled function circuit 700 without additionally involving a processor to operate in real time a software program (e.g., a virtual machine) to perform the operation.

Figure 6:
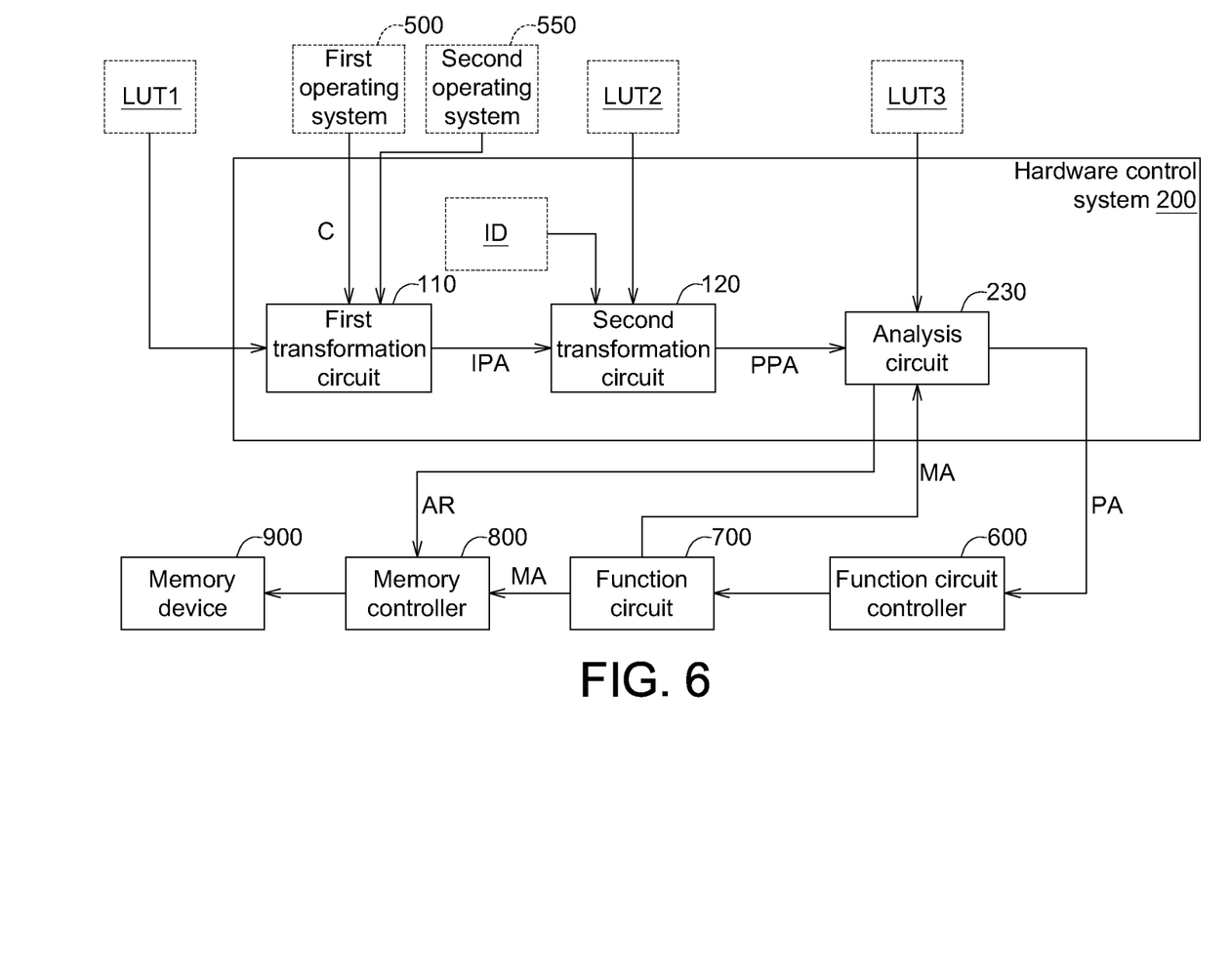
FIG. 6 is a block diagram of a hardware control system according to another embodiment of the present invention.
Figure 7:
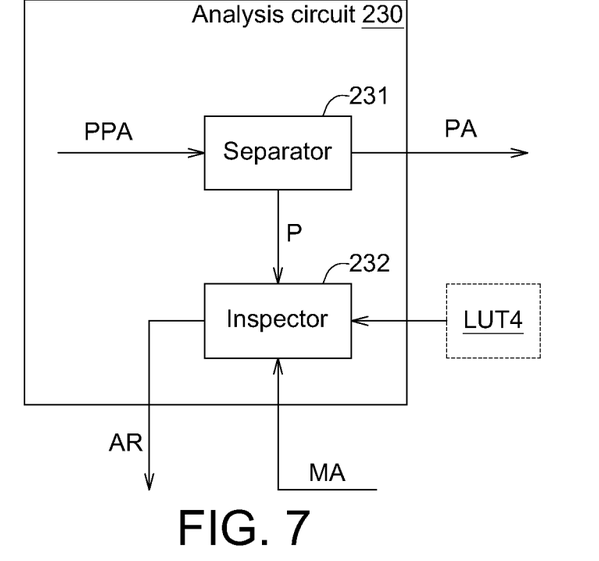
FIG. 7 is a block diagram of an analysis circuit in FIG. 6.

FIG. 6 shows a block diagram of a hardware control system 200 according to another embodiment of the present invention. FIG. 7 shows a block diagram of an analysis circuit 230 in FIG. 6. Referring to FIG. 6 and FIG. 7, the hardware control system 200 of this embodiment differs from the hardware control system 100 from the previous embodiment by the analysis circuit 230, and the description for the remaining identical details is omitted herein. In this embodiment, the analysis circuit 230 includes a separator 231 and an inspector 232. The inspector 232 is different from the above inspector 132. Operation details of the above components are given with the accompanying flowchart below.

Figure 8:
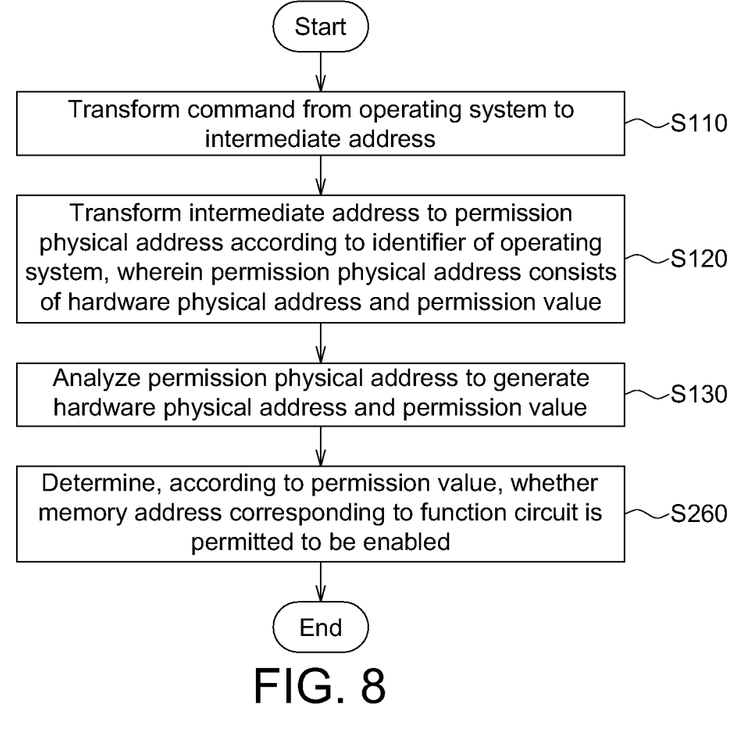
FIG. 8 is a flowchart of a hardware control method according to another embodiment of the present invention.

FIG. 8 shows a flowchart of a hardware control method according to another embodiment of the present invention. The hardware control method of this embodiment differs from the hardware control method in FIG. 2 by step S260. After completing step S130, the separator 231 of the analysis circuit 230 separates a permission physical address PPA into a hardware physical address PA and a permission value P.

In step S260, the inspector 232 determines, according to the permission value P, whether the memory address MA corresponding to the function circuit 700 is permitted to be enabled. In this step, the inspector 232 receives the memory address MA transmitted from the function circuit 700, and looks up a fourth look-up table LUT4 to determine whether the memory address MA can be enabled. The fourth look-up table LUT4 is established by a processor that operates a software program (e.g., a virtual machine) and records a relationship between the permission value P and the memory address MA. In one embodiment, the fourth look-up table LUT4 may record whether the memory address MA corresponding to this permission value P can be read or written.

After the analysis of the inspector 232, an analysis result AR is outputted to the memory controller 800 to cause the memory controller 800 to accordingly enable/disable a read/write operation of the memory address MA of the memory device 900.

Thus, by including the permission value P in the permission physical address PPA, various operating systems are allowed to directly control the function circuit 700 to access the memory address MA permitted to be enabled without additionally involving a processor to operate in real time a software program (e.g., a virtual machine) to perform the operation. Further, with the operation method of the embodiment, it is equivalently performing permission verification twice for "whether the function circuit 700 can use the memory address MA to operate a specific function", further enhancing the security of the system and reducing the risks of piracy of copyrighted content.

Figure 9:
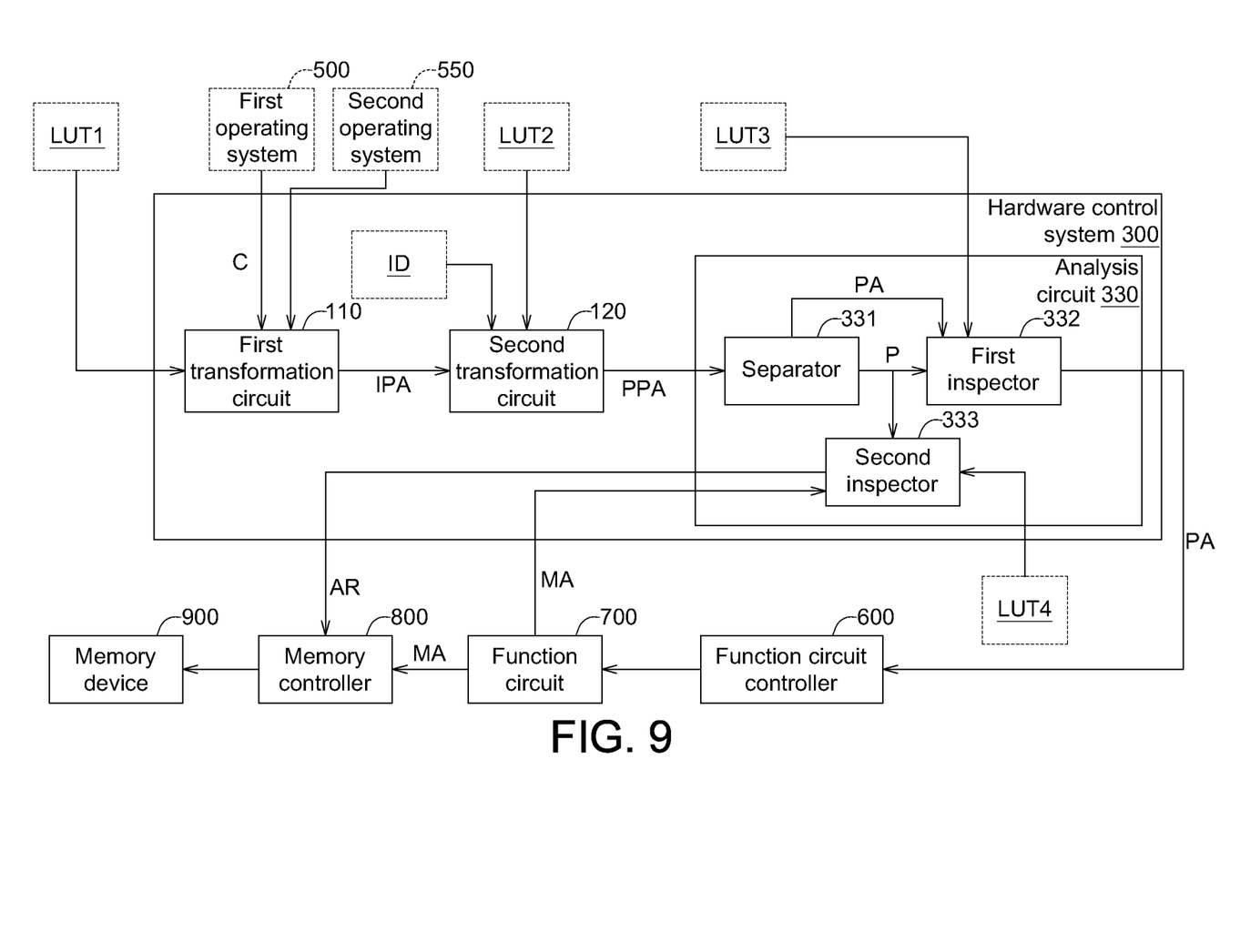
FIG. 9 is a block diagram of a hardware control system according to another embodiment of the present invention.

FIG. 9 shows a block diagram of a hardware control system 300 according to another embodiment of the present invention. An analysis circuit 330 in this embodiment includes a separator 331, a first inspector 332 and a second inspector 333. The separator 331 separates a permission physical address PPA into a hardware physical address PA and a permission value P, and transmits the hardware physical address PA to the first inspector 332 and the permission value P to the first inspector 332 and the second inspector 333.

The first inspector 332 looks up the third look-up table LUT3 to determine whether to enable the function circuit controller 600 corresponding to the hardware physical address PA. As shown in FIG. 9, the control value of the corresponding function circuit controller 600 can be determined through the hardware physical address PA, so as to permit to operate one or more specific functions corresponding to the function circuit 700. While the function circuit 700 is operated, the memory address MA in the memory device 900 can be accessed through the memory controller 800.

The second inspector 333 temporarily stores the permission value P and receives the function circuit controller memory address MA transmitted from the function circuit 700, and analyzes whether the memory address MA corresponding to the function circuit 700 can be accessed. After receiving the memory address MA transmitted from the function circuit 700, the second inspector 333 looks up the fourth look-up table LUT4 according to the permission value P to determine whether the memory address MA can be accessed. After the analysis of the second inspector 333, an analysis result AR is outputted to the memory controller 800 to cause the memory controller 800 to accordingly enable/disable a read/write operation of the memory address MA of the memory device 900.

Thus, given that the second inspector 333 temporarily stores the permission P, various operating systems are allowed to directly access the memory address MA without additionally involving a processor to operate in real time a software program (e.g., a virtual machine) to perform the operation.

Figure 10:
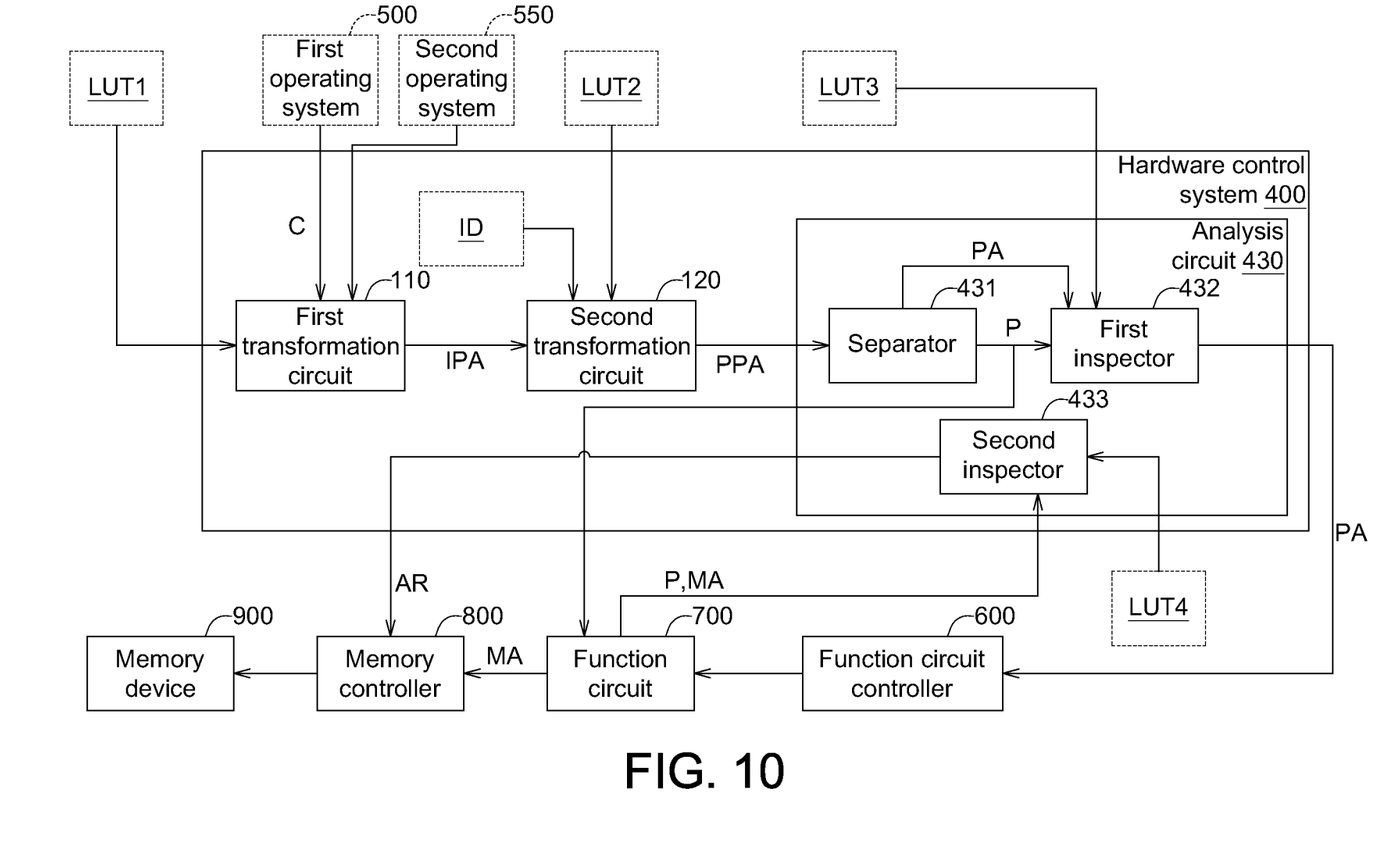
FIG. 10 is a block diagram of a hardware control system according to another embodiment of the present invention.

FIG. 10 shows a block diagram of a hardware control system 400 according to another embodiment of the present invention. An analysis circuit 430 of this embodiment includes a separator 431, a first inspector 432 and a second inspector 433. The separator 431 separates a permission physical address PPA into a hardware physical address PA and a permission value P, and transmits the hardware physical address PA to the first inspector 432 and the permission value P to the first inspector 432 and the function circuit 700.

The first inspector 432 looks up the third look-up table LUT3 to determine whether the function circuit controller 600 corresponding to the hardware physical address PA can be enabled. As shown in FIG. 10, the control value of the corresponding function circuit controller 600 can be controlled through the hardware physical address PA, so as to further permit to operate one or more specific functions of the corresponding function circuit 700. While the function circuit 700 is operated, the memory address MA in the memory device 900 may need to be accessed through the memory controller 800.

The second inspector 433 receives the memory address MA and the corresponding permission value P transmitted from the function circuit 700, and analyzes whether the memory address MA corresponding to the function circuit 700 can be enabled. After receiving the memory address MA and the permission value P transmitted from the function circuit 700, the second inspector 433 looks up the fourth look-up table LUT4 to determine whether the memory address MA is permitted to be operated. After the analysis of the second inspector 433, an analysis result AR is outputted to the memory controller 800 to cause the memory controller 800 to accordingly enable/disable a read/write operation of the memory address MA of the memory device 900.

Thus, in a situation where the second inspector 433 does not have a temporary storage function, the permission value P can still be obtained from the function circuit 700 to perform the above analysis process. It should be noted that, in the hardware control system 300, the second inspector 333 stores the permission value P in advance. However, because signal processing (e.g., operations of the first inspector 332, the function circuit controller 600 and the function circuit 700) requires time and has an issue of time delay, the second inspector 333 first needs to verify whether the memory address MA is the memory address MA corresponding to the permission value P when the memory address MA is received before it can look up a look-up table. However, in the hardware control system 400, because the corresponding memory address MA and the permission value P are concurrently transmitted from the function circuit 700 to the second inspector 433, the need for synchronization and the issue incurred due to synchronization errors are eliminated.

In the various embodiments above, by including the permission value P in the permission physical address PPA, commands from different operating systems can be differentiated. Thus, the operating system is allowed to directly operate the function circuit 700 permitted to be enabled without additionally involving a processor to operate in real time a software program (e.g., a virtual machine) to perform the operation.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hardware control method for controlling a function circuit, the hardware control method comprising:
   transforming a command from an operating system to an intermediate address;
   transforming the intermediate address to a permission physical address according to an identifier of the operating system, wherein the permission physical address consists of a hardware physical address and a permission value; and the identifier indicates which operating system is currently operating;

analyzing the permission physical address to generate the hardware physical address and the permission value;

determining a control value corresponding to the hardware physical address according to the permission value; and permitting, according to the control value, the operating system to control the function circuit.

2. The hardware control method according to claim 1, wherein the step of transforming the command from the operating system to the intermediate address is performed according to a first look-up table.

3. The hardware control method according to claim 1, wherein the step of transforming the intermediate address to the permission physical address according to the identifier of the operating system is performed according to a second look-up table.

4. The hardware control method according to claim 1, wherein the step of determining the control value corresponding to the hardware physical address according to the permission value is performed according to a third look-up table.

5. The hardware control method according to claim 1, wherein the control value represents a state of a function circuit controller corresponding to the hardware physical address, and the function circuit controller is for controlling whether at least a part of functions of the function circuit is permitted to be operated.

6. The hardware control method according to claim 1, further comprising:

determining, according to the permission value, whether a memory address corresponding to the function circuit is permitted to be enabled.

7. The hardware control method according to claim 6, wherein the step of determining whether the memory address corresponding to the function circuit is permitted to be enabled is performed according to a fourth look-up table.

8. The hardware control method according to claim 6, wherein the step of determining whether the memory address corresponding to the function circuit is permitted to be enabled further comprises:

determining, according to the permission value, whether the memory address corresponding to the function circuit is permitted to be read; and determining, according to the permission value, whether the memory address corresponding to the function circuit is permitted to be written.

9. The hardware control method according to claim 6, further comprising:

temporarily storing the permission value; and determining whether the memory address corresponding to the function circuit corresponds to the permission value.

10. A hardware control system, for controlling a function circuit, the hardware control system comprising:

a first transformation circuit, transforming a command from an operating system to an intermediate address;

a second transformation circuit, transforming the intermediate address to a permission physical address according to an identifier of the operating system, wherein the permission physical address consists of a hardware physical address and a permission value; and the identifier indicates which operating system is currently operating; and an analysis circuit, analyzing the permission physical address to generate the hardware physical address and the permission value, and determining a control value corresponding to the hardware physical address according to the permission value, wherein the control value is for permitting the operating system to control the function circuit.

11. The hardware control system according to claim 10, wherein the first transformation circuit transforms the command from the operating system to the intermediate address by looking up a first look-up table.

12. The hardware control system according to claim 10, wherein the second transformation circuit transforms the intermediate address to the permission physical address according to the identifier of the operating system by looking up a second look-up table.

13. The hardware control system according to claim 10, wherein the analysis circuit comprises:

a first inspector, looking up a third look-up table to determine the control value corresponding to the hardware physical address according to the permission value.

14. The hardware control system according to claim 10, wherein the control value represents a state of a function circuit controller corresponding to the hardware physical address, wherein the function circuit controller is for controlling whether at least a part of functions of the function circuit is permitted to be operated.

15. The hardware control system according to claim 10, wherein the analysis circuit comprises:

a second inspector, determining, according to the permission value, whether a memory address corresponding to the function circuit is permitted to be enabled.

16. The hardware control system according to claim 15, wherein the second inspector determines whether the memory address corresponding to the function circuit is permitted to be enabled by looking up a fourth look-up table.

17. The hardware control system according to claim 15, wherein the second inspector further temporarily stores the permission value, and determines whether the memory address corresponding to the function circuit corresponds to the permission value when receiving the memory address corresponding to the function circuit from the function circuit.

18. The hardware control system according to claim 15, wherein the second inspector receives the permission value and the memory address corresponding to the function circuit from the function circuit.

19. The hardware control system according to claim 13, wherein the analysis circuit further comprises:

a second inspector, determining, according to the permission value, whether a memory address corresponding to the function circuit is permitted to be enabled.

20. The hardware control system according to claim 19, wherein the second inspector determines, according to the permission value, whether the memory address corresponding to the function circuit is permitted to be read, and whether the memory address corresponding to the function circuit is permitted to be written.

* * * * *